US009369167B2

(12) United States Patent
Choi

(10) Patent No.: US 9,369,167 B2
(45) Date of Patent: Jun. 14, 2016

(54) CELLULAR-PHONE CASE HAVING RETRACTABLE CARD HOLDING STRUCTURE

(71) Applicant: MARK AND DRAW, LLC, Salem, WI (US)

(72) Inventor: Teak Jin Choi, Kyungki-do (KR)

(73) Assignee: Mark and Draw, LLC., Salem, WI (US)

( * ) Notice: Subject to any disclaimer, the term of this patent is extended or adjusted under 35 U.S.C. 154(b) by 141 days.

(21) Appl. No.: 14/015,744

(22) Filed: Aug. 30, 2013

(65) Prior Publication Data

US 2014/0066143 A1 Mar. 6, 2014

(30) Foreign Application Priority Data

Aug. 30, 2012 (KR) .......................... 10-2012-0095621

(51) Int. Cl.
*H04M 1/00* (2006.01)
*H04B 1/38* (2015.01)
*H04B 1/3888* (2015.01)

(52) U.S. Cl.
CPC ................................. *H04B 1/3888* (2013.01)

(58) Field of Classification Search
CPC ...... H04B 1/3888; H04B 1/38; G06F 1/1626; G06F 2200/1633; G06F 1/16; A45C 11/182; A45C 13/023; A45C 11/00; A45C 2011/002; H04M 1/00
USPC ............. 455/575.1, 575.8, 575.4, 90.3, 550.1
See application file for complete search history.

(56) References Cited

U.S. PATENT DOCUMENTS

| D266,929 | S  | 11/1982 | Coppola |
| 4,768,648 | A  | 9/1988 | Glass et al. |
| 6,026,873 | A  | 2/2000 | Van Geer |
| 6,164,442 | A  | 12/2000 | Stravitz |
| 6,341,693 | B2 | 1/2002 | Konno et al. |
| 6,533,118 | B1 | 3/2003 | Nelson |
| 7,204,398 | B1 | 4/2007 | Smith, Sr. |
| 7,230,823 | B2 | 6/2007 | Richardson et al. |
| D574,819 | S  | 8/2008 | Andre et al. |
| 7,464,814 | B2 | 12/2008 | Carnevali |
| D597,089 | S  | 7/2009 | Khan |
| 7,648,027 | B2 | 1/2010 | Lin et al. |
| D619,130 | S  | 7/2010 | Fellig |
| D626,119 | S  | 10/2010 | Fellig |
| D631,246 | S  | 1/2011 | Boettner |

(Continued)

FOREIGN PATENT DOCUMENTS

EP 0002685343 A1 * 7/2012 ............... H04B 1/38
KR 20120095621 8/2012

*Primary Examiner* — Pablo Tran
(74) *Attorney, Agent, or Firm* — Seager, Tufte & Wickhem LLP.

(57) ABSTRACT

A cellular-phone case having a retractable card holding structure, intended to hold a card in such a way that the card is put into or taken out from the case. The cellular-phone case includes a case body and a card holding means. The case body has a seating space to allow a cellular phone to be seated therein, with an outlet formed at a predetermined position on a back portion of the case body in such a way as to communicate with the seating space. The card holding means includes a support panel fitted into the outlet, the card being disposed on the support panel, and an actuating body provided on a side of the support panel so as to be locked to the outlet. The outlet is provided in the case body, and the card holding means is provided to move into and out of the outlet.

19 Claims, 4 Drawing Sheets

(56) References Cited

U.S. PATENT DOCUMENTS

| | | |
|---|---|---|
| 8,016,107 B2 | 9/2011 | Emsky |
| 8,047,364 B2 | 11/2011 | Longinotti-Buitoni |
| D653,656 S | 2/2012 | Charnas et al. |
| 8,251,210 B2 | 8/2012 | Schmidt et al. |
| 8,267,251 B2 | 9/2012 | Mongan et al. |
| 8,381,904 B1 | 2/2013 | Longinotti-Buitoni |
| D678,871 S | 3/2013 | Mishan et al. |
| D679,694 S | 4/2013 | Fahrendorff et al. |
| D681,024 S | 4/2013 | Chang et al. |
| 8,485,404 B2 | 7/2013 | Monaco et al. |
| 8,504,127 B2 * | 8/2013 | Altschul et al. ............ 455/575.8 |
| D705,764 S * | 5/2014 | Thoni .......................... D14/250 |
| D721,689 S * | 1/2015 | Altschul et al. .............. D14/250 |
| 2003/0230514 A1 | 12/2003 | Baker |
| 2005/0277453 A1 * | 12/2005 | Kim ........................... 455/575.8 |
| 2007/0057004 A1 * | 3/2007 | Butler et al. .................. 224/669 |
| 2007/0215663 A1 | 9/2007 | Chongson et al. |
| 2007/0223183 A1 | 9/2007 | Oja |
| 2008/0017678 A1 | 1/2008 | Anderson et al. |
| 2008/0121321 A1 | 5/2008 | Tiner et al. |
| 2008/0121322 A1 | 5/2008 | Thomson |
| 2008/0142129 A1 | 6/2008 | Reasner et al. |
| 2009/0194444 A1 | 8/2009 | Jones |
| 2010/0224519 A1 | 9/2010 | Kao |
| 2010/0230301 A1 * | 9/2010 | Fellig ........................... 206/232 |
| 2011/0034221 A1 | 2/2011 | Hung et al. |
| 2011/0077061 A1 * | 3/2011 | Danze et al. ............... 455/575.1 |
| 2011/0089078 A1 * | 4/2011 | Ziemba ........................ 206/570 |
| 2011/0136555 A1 | 6/2011 | Ramies et al. |
| 2011/0217946 A1 | 9/2011 | DeAngeles |
| 2011/0253569 A1 | 10/2011 | Lord |
| 2011/0267748 A1 | 11/2011 | Lane et al. |
| 2012/0067751 A1 * | 3/2012 | Mongan et al. ............... 206/216 |

\* cited by examiner

CELLULAR-PHONE CASE HAVING RETRACTABLE CARD HOLDING STRUCTURE

CROSS-REFERENCE TO RELATED APPLICATIONS

The present application claims priority under 35 U.S.C. §119 to Korean Patent Application No. 10-2012-0095621, filed Aug. 30, 2013, the entirety of which is hereby incorporated by reference.

BACKGROUND OF THE INVENTION

1. Field of the Invention

The present invention relates to a cellular-phone case having a retractable card holding structure and, more particularly, to a cellular-phone case having a retractable card holding structure, in which an outlet is provided in a case body, and a card holding means for holding a card is provided to move into and out of the outlet, thus being convenient to store the card, making it easy to put or take the card into or out from the case, and maintaining a good appearance after the card has been stored in the case.

2. Description of the Related Art

Generally, a mobile phone means all phones that may communicate with a general phone subscriber or a different mobile communication phone subscriber through a base station within a wireless zone while a user moves optionally within a mobile communication area, like a car phone. Such a mobile phone is called by the name of a portable phone, a mobile phone, a cordless cellular phone, a cordless portable phone, a pocket phone, etc.

Such a mobile phone is a phone communication terminal that can be easily used while a user carries. Recently, modern people possess the mobile phone as an essential item. The cellular phone is equipped with many additional functions, including digital multimedia broadcasting (DMB), a navigation system, a camera, and a multi media player for playing an MPEG audio layer-3 and a digital moving picture, and performs more functions as a digital device using an application program called application (APP).

In recent years, additional functions are being added to smart phones coming to market, for example the function of surfing a wireless internet through a so-called 4-generation (4G) data communication network and wireless fidelity (WiFi). The design and shape of the smart phone has become better, and the overall size of the smart phone becomes smaller to allow it to be put into a pocket of clothes with minimum weight, so that the weight of the smart phone is gradually reduced. Most of smart phones that are available in Korea today are a bar type in which a front having a screen is formed as a touch screen. The touch screen on the front is made of tempered glass.

The tempered glass is advantageous in that it is resistant to scratch or impacts acting on the front. However, the tempered glass is very vulnerable to impacts acting on the side. Thereby, when a smart phone having a display panel made of the tempered glass falls to the ground because of carelessness during its use, a front panel protecting the display panel or the display panel itself is broken due to impacts against the ground.

Hence, a user is more susceptible to scratching, cracking, or damaging a cellular phone that is relatively expensive and is good in appearance. Moreover, the cellular phone has a growing tendency to be utilized as an accessory that suits a user's taste, by using the appearance of the cellular phone. In order to satisfy a user's demand, cellular-phone cases of various kinds and materials are being developed and coming to market to prevent the damage to the cellular phone and to provide a good appearance.

A mobile phone case is typically classified into a pouch type, a wallet type and a housing/case type. The pouch type is intended to hold and store the mobile phone in a holding space made of leather or cloth. The wallet type is configured to form a space holding a mobile phone therein by cutting leather and to open and close a cover. The housing/case type is made of a synthetic resin material such as plastic or silicone, thus allowing the mobile phone to be fitted into and held in a holding space defined therein.

However, the pouch type is problematic in that the entire cellular phone is completely put into the holding space defined in the pouch, so that the cellular phone should be taken out from the pouch when a user desires to use the cellular phone, thus causing inconvenience. The wallet type is problematic in that the cover of the wallet should be opened or spread to use the cellular phone, thus causing inconvenience when a user desires to make a phone call. Meanwhile, the housing/case type is advantageous in that it is easy to confirm contents displayed on the touch screen disposed on the front of the bar type cellular phone, and in addition, it is easy to use a touch key on the touch screen. However, the housing/case type is problematic in that the material of the housing/case is mainly synthetic resin such as plastic, so that it has an unpleasant texture or feel.

Further, modern people generally carry the cellular phone as well as at least one or more cards, for example, a transportation card for paying a public transport fare, a credit card used to buy goods on credit, and a discount card for getting a discount when purchasing goods. Even though these cards are used in everyday life as frequently as the cellular phone, it is common to store the cards in a separate wallet.

Recently, a cellular-phone case having a card holding structure is being developed to simultaneously carry both the cellular phone and the card, thus making it convenient to use the cellular phone and the card.

SUMMARY OF THE INVENTION

Accordingly, the present invention has been made keeping in mind the above problems occurring in the related art, and an object of the present invention is to provide a cellular-phone case having a retractable card holding structure, in which an outlet is provided in a case body, and a card holding means for holding a card is provided to move into and out of the outlet, thus being convenient to store the card, making it easy to put or take the card into or out from the case, and maintaining a good appearance after the card has been stored in the case, and thereby meeting the demands of the times and the requirements of consumers.

In order to accomplish the above object, the present invention provides a cellular-phone case having a retractable card holding structure, intended to hold a card in such a way that the card is put into or taken out from the case, the cellular-phone case including a case body having a seating space to allow a cellular phone to be seated therein, with an outlet being formed at a predetermined position on a back portion of the case body in such a way as to communicate with the seating space, and a card holding means including a support panel fitted into the outlet, the card being disposed on the support panel, and an actuating body provided on a side of the support panel and disposed to be locked to the outlet.

Further, a receiving hole may be formed in an inner surface of the back portion to allow the support panel to be put into or taken out from the case body, a pair of guide grooves each having a triangular cross-section being formed in the receiving hole, a pair of guide protrusions being formed on an upper surface of the support panel to be fitted into the guide grooves and thereby guided, and rail grooves may be further formed on both sides of the receiving hole to guide both ends of the support panel.

Moreover, an elongated receiving hole may be further formed in the support panel to receive an embossed letter protruding from a surface of the card and allow the disposed card to be separated.

Further, the actuating body may include an actuating recess on an upper surface thereof and a locking protrusion on a lower surface thereof; the locking protrusion being locked to a locking hole formed in an inner surface of an outer wall that is formed at a predetermined position of the case body.

Furthermore, the case body may include a plurality of through holes on the back portion thereof, with annular heat dissipation protrusions being further formed on an inner surface of the back portion to surround the through holes, an elongated spacer protrusion being further formed in the receiving hole to prevent the cellular phone seated in the case body from rubbing against the support panel when it is moved.

As is apparent from the above description, that cellular-phone case having a retractable card holding structure of the present invention is advantageous in that the outlet is provided in the case body, and the card holding means for holding the card is provided to move into and out of the outlet, thus being convenient to store the card, making it easy to put or take the card into or out from the case, and maintaining a good appearance after the card has been stored in the case.

BRIEF DESCRIPTION OF THE DRAWINGS

The above and other objects, features and advantages of the present invention will be more clearly understood from the following detailed description taken in conjunction with the accompanying drawings, in which.

Figure 1:
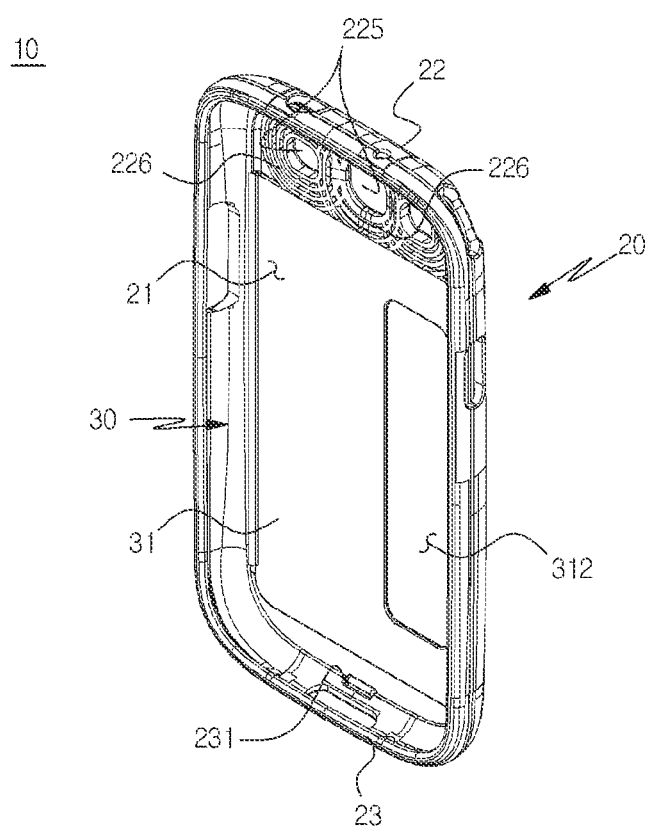
FIG. 1 is a perspective view showing a cellular-phone case having a retractable card holding structure according to the present invention.

<Description of the Reference Numerals in the Drawings>

| | | | |
|---|---|---|---|
| 10: | cellular-phone case | 20: | case body |
| 30: | card holding means | 21: | seating space |
| 22: | back portion | 221: | outlet |
| 222: | receiving hole | 223: | guide groove |
| 224: | rail groove | 225: | through hole |
| 226: | heat dissipation protrusion | | |
| 227: | spacer protrusion | 23: | outer wall |
| 231: | locking hole | 31: | support panel |
| 311: | guide protrusion | 32: | actuating body |
| 321: | actuating recess | 322: | locking protrusion |
| 100: | card | | |

DESCRIPTION OF PREFERRED EMBODIMENTS

Hereinafter, a cellular-phone case having a retractable card holding structure according to a preferred embodiment of the present invention will be described with reference to the accompanying drawings. Herein, thicknesses of lines or sizes of components, which are shown in the drawings, may be exaggerated for the clarity of description and for convenience sake. Further, terms that will be described below are defined in consideration of the function of the present invention, and may be changed depending on the intention of a user or an operator or on the custom. Accordingly, these terms should be defined based on the entire contents of the specification.

Further, the following embodiment does not limit the scope of the present invention but is merely illustrative. It is possible to implement various embodiments through the technical spirit of this invention.

Figure 2:
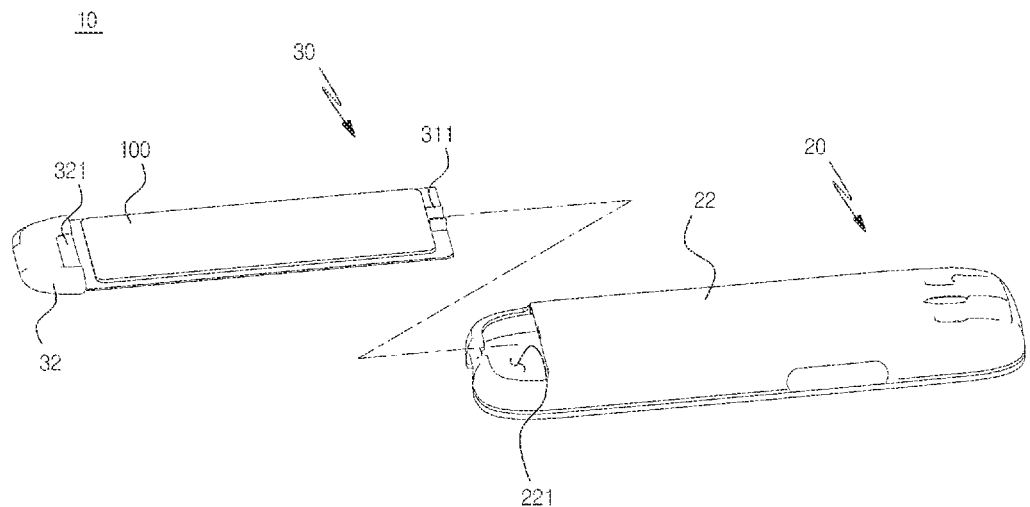
FIG. 2 is an exploded perspective view showing the cellular-phone case having the retractable card holding structure according to the present invention.
Figure 3:
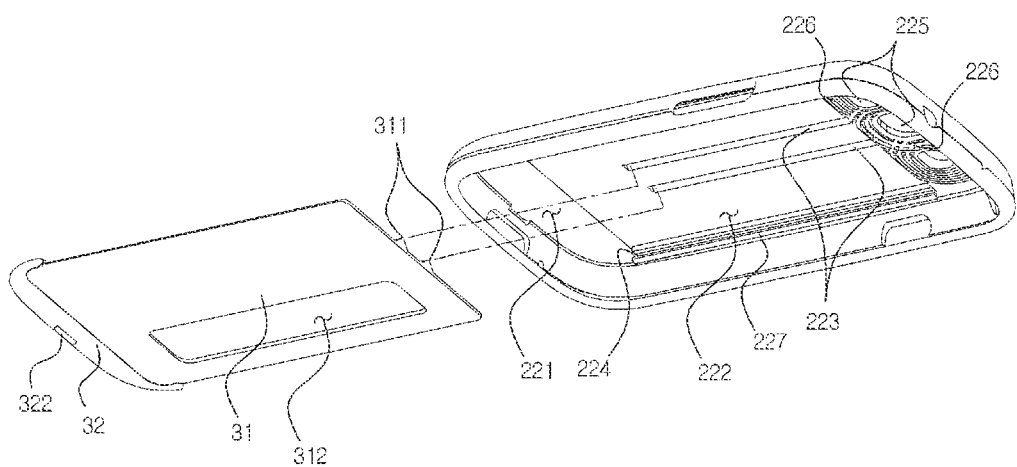
FIG. 3 is a bottom perspective view showing a disassembled state of the cellular-phone case having the retractable card holding structure according to the present invention.
Figure 4:
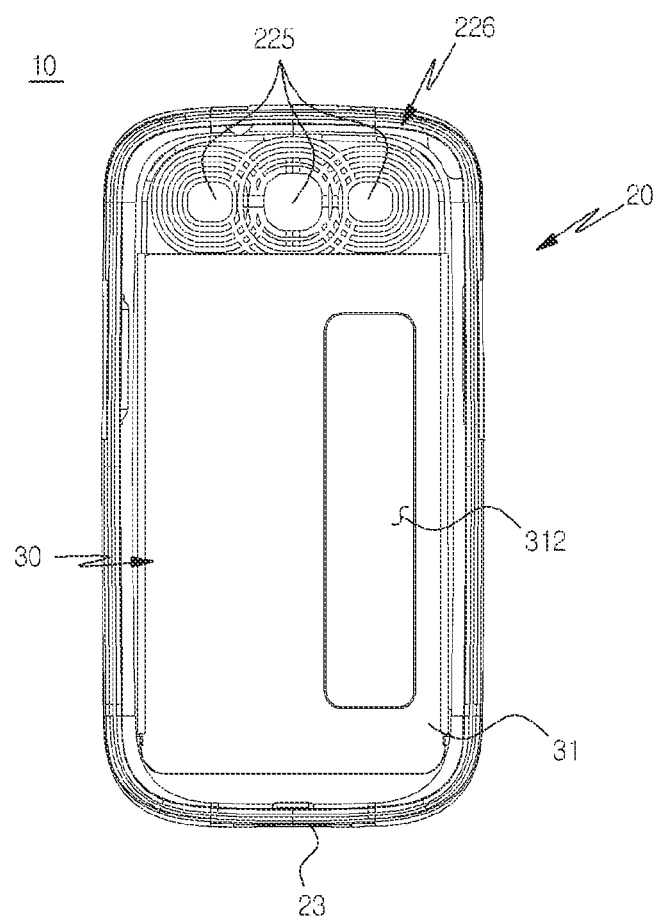
FIG. 4 is a front view showing the cellular-phone case having the retractable card holding structure according to the present invention.
Figure 5:
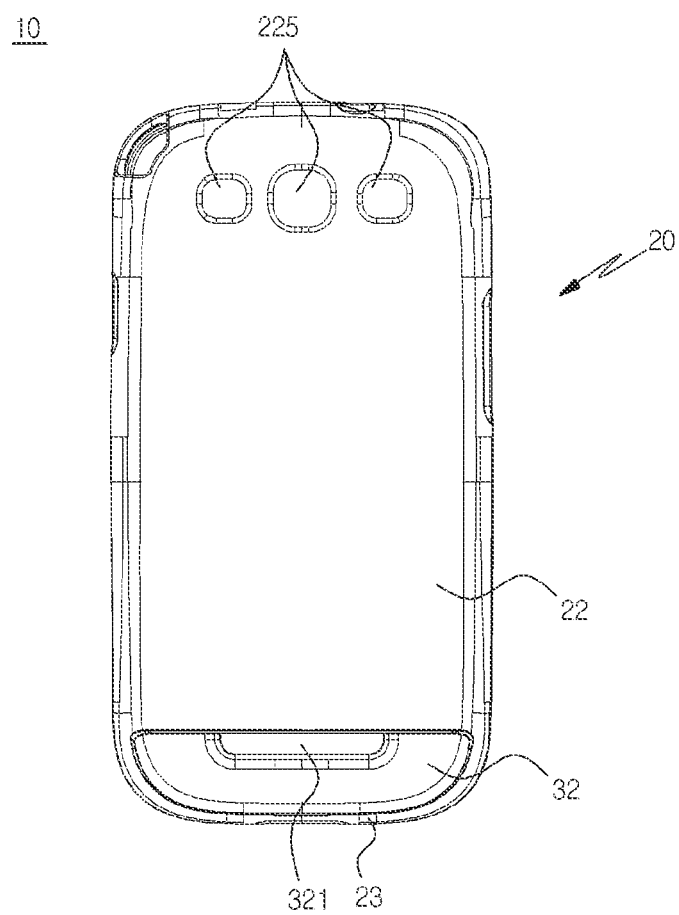
FIG. 5 is a rear view showing the cellular-phone case having the retractable card holding structure according to the present invention.

FIG. 1 is a perspective view showing a cellular-phone case having a retractable card holding structure according to the present invention, FIG. 2 is an exploded perspective view showing the cellular-phone case having the retractable card holding structure according to the present invention, FIG. 3 is a bottom perspective view showing a disassembled state of the cellular-phone case having the retractable card holding structure according to the present invention, FIG. 4 is a front view showing the cellular-phone case having the retractable card holding structure according to the present invention, and FIG. 5 is a rear view showing the cellular-phone case having the retractable card holding structure according to the present invention.

As shown in the drawings, the cellular-phone case 10 having the retractable card holding structure according to the present invention (hereinafter referred to as the cellular-phone case for convenience sake) is the cellular-phone case that holds a card in such a way as that it is put into or taken out from the case. Such a cellular-phone case 10 includes a case body 20 and a card holding means 30.

The case body 20 is open at one side thereof to allow a user to touch a display screen of a cellular phone (not shown) fastened to the case body 20, and is made of a synthetic resin material having elasticity. The case body 20 has a seating space 21 to allow the cellular phone to be fitted and seated therein. An outlet 221 is provided at a predetermined position on a back portion 22 of the case body 20 in such a way as to communicate with the seating space 21.

Here, a rectangular receiving hole 222 is formed in an inner surface of the back portion 22 and communicates with the outlet 221 to allow a support panel of the card holding means 30 that will be described below to be put into and taken out from the case body 20. A pair of guide grooves 223 each having a triangular cross-section is formed longitudinally in the receiving hole 222. Rail grooves 224 are further formed on both sides of the receiving hole 222 to guide both ends of the support panel 31.

Further, a plurality of through holes 225 is formed in the back portion 22 of the case body 20 to take a picture. Annular heat dissipation protrusions 226 are further formed on the inner surface of the case body 20 in such a way as to surround the through holes 225. An elongated spacer protrusion 227 is further formed in the receiving hole 222 to prevent the cellular phone seated in the case body 20 from rubbing against the moving support panel 31.

In other words, the heat dissipation protrusions 226 dissipate heat from the interior of the case, thus preventing heat from escaping to the outside via the through holes 225. The spacer protrusion 227 prevents the support panel 31 from rubbing against the cellular phone while the support panel 31 is moved in and out. The support panel 31 is formed in the shape of an elongated bar using synthetic resin. Here, the support panel 31 is movably engaged with the rail grooves 224 that are provided on both sides of the receiving hole 222, so the support panel 31 can be moved along the rail grooves 224.

In this respect, the heat dissipation protrusions 226 are formed at regular intervals in such a way that heat dissipation protrusions having relatively larger diameters surround heat dissipation protrusions having smaller diameters.

The card holding means 30 includes the support panel 31 which is fitted into the outlet 221 and on which the card 100 is disposed, and an actuating body 32 which is provided on a side of the support panel 31 and is disposed to be caught by the outlet 221. The support panel 31 and the actuating body 32 are integrated into a single structure and are made of a synthetic resin.

Here, a pair of guide protrusions 311 is provided on an upper surface of the support panel 31 in such a way as to be fitted into the guide grooves 223 and thus guided. An elongated receiving hole 312 is further formed to receive embossed letters (letters, such as a card number or an expiration date, protruded by pressing) that protrude from a surface of the card 100, in addition to separating the card 100 from the support panel 31.

Preferably, a rectangular recess is further formed in the upper surface of the support panel 31 to allow a lower portion of the card to be fitted therein.

Further, the guide grooves 223 are not connected to the outlet 221 to prevent the guide protrusions 311 of the support panel 31 from being separated from the guide grooves 223 and thereby prevent the support panel 31 from being removed from the outlet 221.

Here, an actuating recess 321 is formed in the upper surface of the actuating body 32, while a locking protrusion 322 is formed on the lower surface of the actuating body 32. The locking protrusion 322 is locked to a locking hole 231 that is formed in the inner surface of an outer wall 23 provided on a side of the case body 20.

The use of the cellular-phone case having the retractable card holding structure configured as described above will be described. First, a user inserts his or her nail or finger into the actuating recess 321 to take the card 100 out from the cellular-phone case and then pulls the actuating body 32 out. At this time, the locking protrusion 322 is removed from the locking hole 231, so that the support panel 31 is moved along the rail grooves 224 to be taken out.

Subsequently, he or she puts his or her finger into the lower portion of the receiving hole 312 of the support panel 31 to raise the card 100 disposed on the upper surface of the support panel 31. Thereafter, the card 100 is gripped by the other hand and then is used. After the card 100 has been used, the card 100 is placed on the upper surface of the support panel 31 in such a way as to be locked to the guide protrusion 311. Next, the support panel 31 is moved into the case such that the locking protrusion 322 engages with the locking hole 231.

What is claimed is:

1. A cellular-phone case having a retractable card holding structure, intended to hold a card in such a way that the card is put into or taken out from the case, the cellular-phone case comprising:
  a case body having a seating space to allow a cellular phone to be seated therein, with an outlet being formed at a predetermined position on a back portion of the case body in such a way as to communicate with the seating space; and
  card holding means including:
    a support panel fitted into the outlet, the card being disposed on the support panel; and
    an actuating body provided on a side of the support panel, and disposed to be locked to the outlet.

2. The cellular-phone case as set forth in claim 1, wherein a receiving hole is formed in an inner surface of the back portion to allow the support panel to be put into or taken out from the case body, a pair of guide grooves each having a triangular cross-section being formed in the receiving hole, a pair of guide protrusions being formed on an upper surface of the support panel to be fitted into the guide grooves and thereby guided, and
  rail grooves are further formed on both sides of the receiving hole to guide both ends of the support panel.

3. The cellular-phone case as set forth in claim 1, wherein an elongated receiving hole is further formed in the support panel to receive an embossed letter protruding from a surface of the card and allow the disposed card to be separated.

4. The cellular-phone case as set forth in claim 1, wherein the actuating body comprises an actuating recess on an upper surface thereof and a locking protrusion on a lower surface thereof, the locking protrusion being locked to a locking hole formed in an inner surface of an outer wall that is formed at a predetermined position of the case body.

5. The cellular-phone case as set forth in claim 1, wherein the case body comprises a plurality of through holes on the back portion thereof, with annular heat dissipation protrusions being further formed on an inner surface of the back portion to surround the through holes, an elongated spacer protrusion being further formed in the receiving hole to prevent the cellular phone seated in the case body from rubbing against the support panel when it is moved.

6. A cellular-phone case comprising:
  a case body having a back portion and a space for receiving a cellular phone therein, wherein the back portion includes an inner surface facing the space; and
  a card holding structure including a support panel that is received by and retractable from the case body, wherein the case body is configured such that a card may be positioned between the inner surface of the back portion and the support panel within the space.

7. The cellular-phone case of claim 6, wherein the case body includes an outlet, and the card holding structure fits within and is retractable from the outlet.

8. The cellular-phone case of claim 7, wherein the outlet is in communication with the space.

9. The cellular-phone case of claim 8, wherein the support panel includes a recess therein for receiving at least a portion of the card therein.

10. The cellular-phone case of claim 8, wherein the support panel defines an opening therein.

11. The cellular-phone case of claim 6, further including a locking structure configured to selectively lock the card holding structure to the case body.

12. The cellular-phone case of claim 6, wherein the card holding structure includes an actuating body configured to selectively allow a user to engage the card holding structure.

13. The cellular-phone case of claim 6, wherein the card holding structure is slidably retractable from the case body.

14. A cellular-phone case comprising:
  a case body having a back portion, a seating space and an outlet formed at a position on a back portion of the case body in such a way as to communicate with the seating space; and a support panel configured to hold a card and fit into the outlet, wherein the card is positioned between the back portion and the support panel within the seating space.

15. The cellular-phone case of claim 14, wherein the support panel is slidably retractable from the outlet.

16. The cellular-phone case of claim 15, further including a locking structure configured to selectively lock the support panel to the case body.

17. The cellular-phone case of claim 14, wherein the support panel includes a recess therein for receiving at least a portion of the card.

18. The cellular-phone case of claim 14, wherein the support panel defines an opening therein.

19. The cellular-phone case of claim 14, wherein the support panel is a drawer slidably disposed with the case body and configured to hold a card.

* * * * *